United States Patent [19]

Tokuda et al.

[11] Patent Number: 5,036,435
[45] Date of Patent: Jul. 30, 1991

[54] ILLUMINATION PANEL

[75] Inventors: Shuichirou Tokuda; Noriyuki Furukawa, all of Nagoya; Yoshinori Kawai, Toyohashi, all of Japan

[73] Assignee: Mitsubishi Rayon Company, Ltd., Tokyo, Japan

[21] Appl. No.: 525,697

[22] Filed: May 21, 1990

[51] Int. Cl.⁵ ............................................. F21V 7/04
[52] U.S. Cl. ...................................... 362/31; 362/32
[58] Field of Search ............................ 362/26, 31, 32

[56] References Cited

U.S. PATENT DOCUMENTS 4,141,058  2/1979  Mizohata et al. ................. 362/32
4,811,507  3/1989  Blanchet ......................... 362/31 X
4,845,596  7/1989  Mouissie ......................... 362/26 X Primary Examiner—Allen M. Ostrager
Attorney, Agent, or Firm—Oblon, Spivak, McClelland, Maier & Neustadt

[57] ABSTRACT

An illumination panel, which comprises an optical fiber sheet formed by arranging a plurality of optical fibers having a core-sheath structure, which has one end optically connected to a light source and a light-leaking portion on at least one surface thereof, a surface panel arranged on the front surface side of the optical fiber sheet, and a reflecting layer arranged on the back surface side of the optical fiber sheet, wherein the light-leaking portion is formed of a plurality of flaws extending to the core of the optical fiber from the sheath thereof, the light-leaking width of the light-leaking portion increases toward the side far from the light source from the side near to the light source, the presence density of the flaws increases toward the side far from the light source from the side near to the light source, and the depth of the flaws increases toward the side far from the light source from the side near to the light source, whereby the entire illumination surface is uniformly illuminated.

10 Claims, 3 Drawing Sheets

ILLUMINATION PANEL

BACKGROUND OF THE INVENTION

1. Field of the Invention

The present invention relates to an illumination panel which is capable of emitting a light, incident on an optical fiber from a light source in the form of a plane, from the side face of the optical fiber and illuminating a transparent display board, a liquid crystal or the like, from the back face thereof, with this light.

2. Description of the Related Art

An optical fiber having a core-sheath structure transmits a light passing through the interior of the core while wholely reflecting the light. It is known from, for example, Japanese Examined Patent Publication No. 46-42534 and Japanese Examined Utility Model Publication No. 53-24750 that parts of the sheath layer are broken at predetermined portions of this optical fiber to form flaws such as notches reaching the core, which act as light-leaking portions, and an illumination panel in which light leaking from these light-leaking portions is utilized for illumination is fabricated.

This conventional technique is disadvantageous in that light leaking from the light-leaking portion generally becomes darker as the light moves away from the light source, and the brightness of the display panel becomes uneven.

A technique for overcoming this disadvantage of the uneven display is proposed, for example, in Japanese Examined Patent Publication No. 61-24684 and Japanese Examined Patent Publication No. 61-24685. According to this conventional technique, the presence density of flaws forming the light-leaking portion is controlled along the longitudinal direction of the optical fiber so that the flaw density can be expressed by a certain function, whereby a good brightness uniformity is obtained.

More specifically, if the density n of flaws formed at each position r of the optical fiber is controlled so that the flaw density is expressed by the following formula:

$$n = \frac{1}{C \cdot e^{-(r-r_0)}}$$

wherein $r_0$ represents the illumination-starting position of the optical fiber and C represents a constant, a good brightness uniformity can be obtained in the longitudinal direction. The outline of a formation of a light-leaking portion of the optical fiber and the relationship between the above-mentioned flaw density n and the distance from the end on the side of the light source are shown in FIG. 7.

As a practically effective means for forming light-leaking portions in an optical fiber sheet, there is generally adopted the hot stamping method in which an emery paper is placed on the optical fiber sheet, and a heating plate is pressed onto the emery paper and fine particles fixed to the surface of the emery paper are protruded into the sheath layer of the optical fiber by heat and pressure to break the sheath layer.

Where the light-leaking portion is formed by this hot stamping method, the change of the flaw density in the light-leaking portions along the longitudinal direction is realized, for example, by spreading a cushion sheet formed of a rubber below the optical fiber sheet and changing the thickness of the cushion sheet according to need, to partially control the compressive force applied when the heating plate is pressed to the optical fiber sheet.

Nevertheless, although the presence density of flaws formed in the light-leaking portions can be changed by the hot stamping method, the thickness of the cushion sheet must be changed substantially in compliance with the above-mentioned function of the conventional technique, to control the flaw density. Practically, the necessary control range of the thickness is within several hundred microns, and it is very difficult and industrially almost impossible to control the thickness of the cushion sheet at such a level, in compliance with the function.

Furthermore, even if this control of the thickness of the cushion sheet is possible, when a light is incident on the optical fiber sheet having thus-formed light-leaking portions from a light source, the spread of the light (light quantity distribution, outgoing angle distribution and the like) differs according to the kind of light source, and therefore, by controlling only the flaw density it is not easy to control the probability of the light leakage and the light exposure quantity, and bring the residual light quantity close to zero.

If a formation of flaws on an optical fiber sheet, fabricated by arranging optical fibers in the form of a sheet, by the hot stamping method is attempted, it is substantially impossible to form light-leaking portions having a pattern of the conventional technique as shown in FIG. 7. In FIG. 7, the light-leaking portion is expressed as being formed along the entire width of the optical fiber in the plane view and is seen to be present along almost ½ of the circumference of the optical fiber. In practice, however, where a plurality of optical fibers are arranged in the form of a sheet, it is impossible to form a light-leaking portion along ½ of the circumference, as seen from FIG. 4, and the region of the light-leaking portion must be reduced to a fraction of ½ of the circumference, with the result that the probability of light leakage is greatly reduced, and thus by controlling the flaw density only as taught by the conventional technique, the probability of the light leakage and the leaking light quantity cannot be sufficiently controlled and it is impossible to realize a high-performance illumination panel in which the residual light quantity is small and the light utilization ratio is high.

According to the sand blasting method, as another conventional technique of forming light-leaking portions, fine particles such as sand grains or glass beads are jetted from a nozzle against an objective material, and light-leaking portions can be formed substantially along ½ of the circumference, but because of characteristics of the sand blasting method, it is difficult to control the flaw density in compliance with the function of $n = (C \cdot e^{-(r-r_0)})^{-1}$ only by jetting fine particles, and the flaw density cannot be made substantially constant over the entire region.

Furthermore, according to a method comprising pressing a projecting member such as a needle into an optical fiber, it is industrially substantially impossible to realize an illumination panel having light-leaking portions controlled as taught in the conventional technique.

SUMMARY OF THE INVENTION

The present invention was completed under this background, and a primary object of the present invention is to provide an illumination panel in which the entire illumination surface can be uniformly illuminated and an optical energy passing within an optical fiber can be utilized at a high efficiency, and which can be easily fabricated on an industrial scale.

The inventors investigated the attaining of the above object and found that, if the light-leaking width and the flaw depth, as well as the flaw density in the light-leaking portions, are controlled so that the width and depth increase as the flaws become more distant from the light source, the above-mentioned object of the present invention can be effectively attained. The present invention is based on this finding.

More specifically, in accordance with the present invention, there is provided an illumination panel comprising an optical fiber sheet formed by arranging a plurality of optical fibers having a core-sheath structure, which has at least one end optically connected to a light source and a light-leaking portion on at least one surface thereof, a surface panel arranged on the front surface side of the optical fiber sheet, and a reflecting layer arranged on the back surface side of the optical fiber sheet, wherein the light-leaking portion is formed of a plurality of flaws extending to the core of the optical fiber from the sheath thereof, the light-leaking width of the light-leaking portion increases toward the side far from the light source from the side near to the light source, the presence density of the flaws increases toward the side far from the light source from the side near to the light source, and the depth of the flaws increases toward the side far from the light source, from the side near to the light source, whereby the entire illumination surface is uniformly illuminated.

According to one preferred embodiment of the present invention, the light-leaking width of the light-leaking portion, the presence density of the flaws, and the depth of the flaws are continuously or stepwise changed in proportion to the distance from the end of the optical fiber on the side of the light source.

According to another preferred embodiment of the present invention, the light-leaking portion is arranged on the side of the reflecting layer.

According to still another preferred embodiment of the present invention, the light-leaking portion is arranged on the side of the surface panel.

According to still another preferred embodiment of the present invention, the optical fiber has light-leaking portions on both of the front surface and the back surface.

According to still another embodiment of the present invention, bonding between the surface panel and the optical fiber sheet and bonding between the optical fiber sheet and the reflecting layer are effected through adhesive layers.

In the illumination panel of the present invention, the light-leaking portion of each optical fiber is controlled so that the presence density of flaws and the depth of flaws are changed according to the distance from the end of the optical fiber on the side of the light source to control the probability of the light leakage and the quantity of the leaking light, and the light-leaking width is controlled to attain a good illumination evenness and control the residual light quantity.

DESCRIPTION OF THE PREFERRED EMBODIMENTS

The present invention will now be described in detail with reference to embodiments illustrated in the accompanying drawings.

Figure 1:
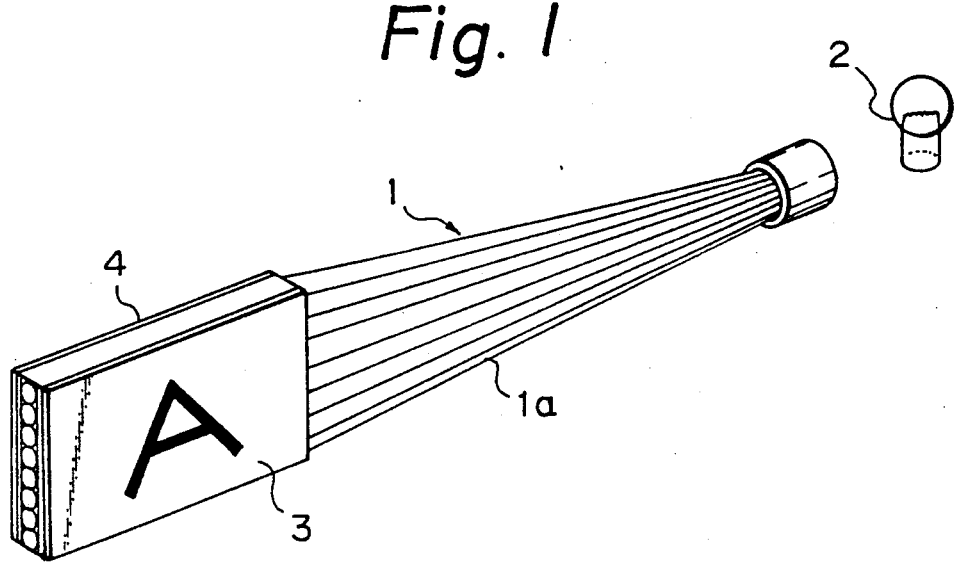
FIG. 1 is a perspective view illustrating the appearance of an illumination panel according to one embodiment of the present invention.
Figure 2:
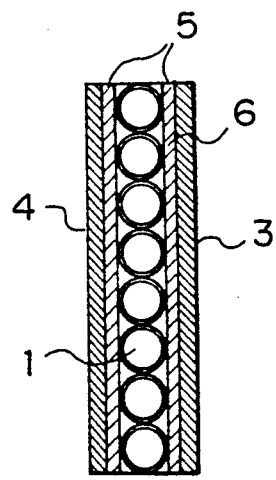
FIG. 2 is a cross-sectional view of the illumination panel of the embodiment shown in FIG. 1.

The appearance of an illumination panel according to one embodiment of the present invention is illustrated in FIG. 1. This illumination panel comprises an optical fiber sheet 1 formed by arranging a plurality of optical fibers 1a having a structure of a core 1b and a sheath 1c, which is optically connected to a light source 2 at one end where the optical fibers are converged and has a light-leaking portion on one surface, a surface panel 3 arranged on the front surface side of the optical fiber sheet 1, and a reflecting layer 4 arranged on the back surface side of the optical fiber sheet 1. The surface panel 3 is bonded to the optical fiber sheet 1 through an adhesive layer 5 and the reflecting layer 4 is bonded to the optical fiber sheet 1 through an adhesive layer 5, whereby the surface panel 3 and reflecting layer 4 are integrated with the optical fiber sheet 1.

The material of the optical fiber used for the illumination panel of the present invention is not particularly critical, but in view of the handling ease, an optical fiber having a plastic core is preferably used. From the viewpoint of the handling of the optical fiber, the thickness of the optical fiber is important, and the thickness is appropriately selected according to the intended use. Nevertheless, in view of the required light quantity, i.e., the brightness, preferably the diameter of the optical fiber is smaller than 3 mm. Any method can be adopted for obtaining the optical fiber sheet, as long as a plurality of optical fibers 1a can be arranged in the form of a sheet. For example, a sheet formed by arranging optical fibers in parallel and bonding them with an adhesive or the like, a sheet in which optical fibers are fusion-bonded to one another, and a woven sheet of optical fibers can be used.

In the surface panel used for the illumination panel of the present invention, the presence or absence of display letters or pictures is not critical, and the degree of the transparency is not critical. If letters or pictures exist thereon, the surface panel can be used directly as a display board. When the illumination panel is used as a background light for a liquid crystal or the like, a surface panel free of letters or pictures is preferably used. In general, a completely transparent panel is not used, but a panel having a certain diffusing function is used.

Any commercially available reflecting tapes, reflecting sheets, and reflecting boards can be used as the reflecting layer in the illumination panel of the present invention, and appropriate reflecting layers are selected according to the diffusing effect at the reflection in view of the intended use.

The pattern of the light-leaking portion, the light-leaking mechanism, and the evenness of the light leakage in the illumination panel of the present invention will now be described with reference to the accompanying drawings, with respect to a typical embodiment wherein the light-leaking portion is arranged on the side of the surface panel.

Figure 3:
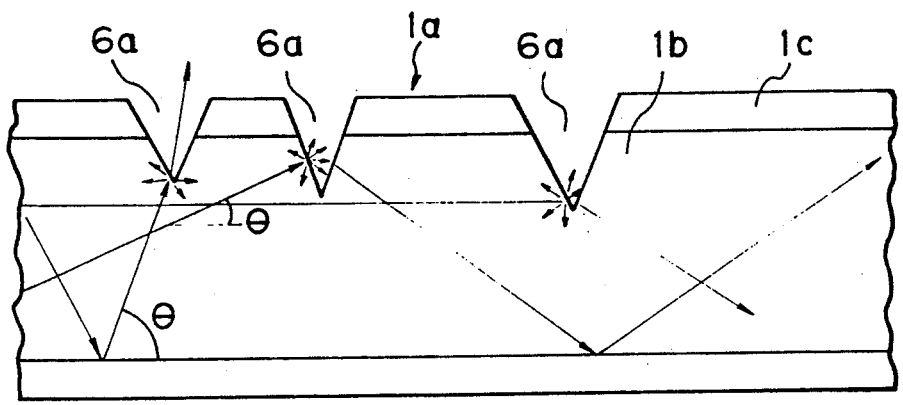
FIG. 3 is a diagram illustrating the passage of rays within an optical fiber.

FIG. 3 shows typical instances of rays leaking from flaws 6a formed in the light-leaking portion 6 or passing through the optical fiber 1a without leaking. In this embodiment, the optical fiber 1a comprises a core 1b and a sheath layer 1c, and the flaws 6a break through the sheath layer 1c and extend to the core 1b.

As shown in FIG. 3, rays passing through the central portion do not leak from shallow flaws but leak only from deep flaws. Accordingly, it is seen that the probability of the light leakage depends not only on the presence density of flaws but also on the depth thereof.

In the illumination panel of the present invention, the light-leaking portion is characterized in that the flaws on the side near to the light source are shallow and the flaws on the side distant from the light source are deep.

Figures 4A, 4B, 4C:
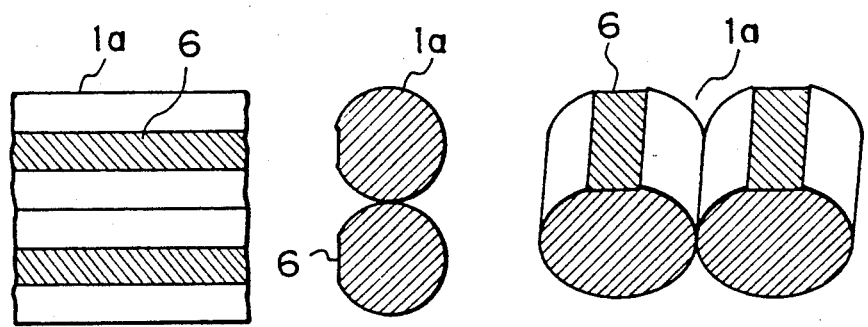
FIG. 4-(a) is a plane view showing an example of an optical fiber sheet in which light-leaking portions are formed by the hot stamping method, FIG. 4-(b) is a cross-sectional view of the sheet shown in FIG. 4-(a), and FIG. 4-(c) is a cross-sectional perspective view of the sheet shown in FIG. 4-(a)

FIG. 4 shows the plane and cross-section of the optical fiber formed by the hot stamping method without controlling the light-leaking portion. In FIG. 4, the smeared portion is the light-leaking portion 6, and the straight line between the two light-leaking portions 6 is the bonding boundary between the optical fibers. In the example shown in FIG. 4, the light-leaking width is constant.

As apparent from the diagram of FIG. 4, the light-leaking width is only ⅛ to ¼ of the diameter of the optical fiber 1a, and if a hot stamping apparatus customarily used in this field is employed, the leaking width is at most about 1/6 of the entire circumferential length of the optical fiber 1a.

In the light-leaking portion of the illumination panel of the present invention, the light-leaking width is narrow on the side near to the light source and broad on the side far from the light source.

The reason for this is as described in detail hereinbefore with reference to FIG. 3, in connection with the control of the light-leaking portion of each optical fiber, to attain a good brightness uniformity and control the residual light quantity, it is necessary to control the light-leaking width while changing the presence density and depth of flaws according to the distance from the end on the side of the light source for controlling the probability of the light leakage and the residual light quantity.

By appropriately controlling the parameters concerning the light-leaking portion in the above-mentioned manner, parts of rays incident on the optical fiber sheet leak while passing through the interiors of respective optical fibers, and the residual light quantity at the final end can be reduced substantially to zero, and simultaneously, a good brightness uniformity can be attained throughout the optical fiber sheet when the sheet is observed from above.

More specifically, preferably all of the light-leaking width, the presence density of the flaws, and the depth of the flaws are increased in direct proportion to the distance from the end of the optical fiber on the side of the light source.

In the present invention, the light-leaking width of the light-leaking portion, the presence density of the flaws, and the depth of the flaws can be continuously or stepwise changed in direct proportion to the distance from the end of the optical fiber on the side of the light source.

Figure 6:
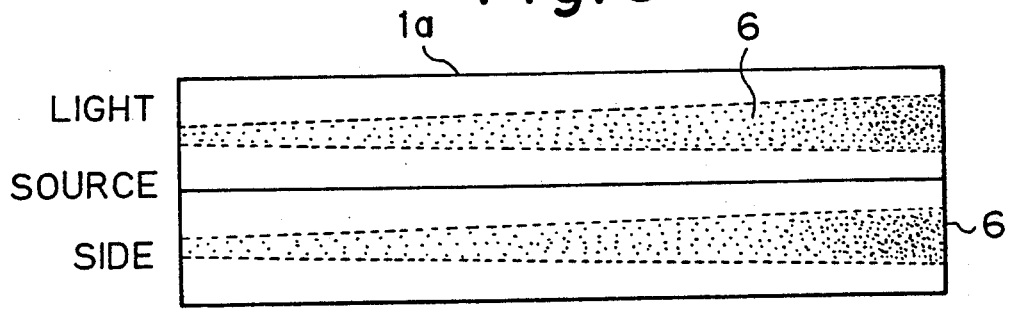
FIG. 6 is a plane view of an optical fiber sheet, which illustrates a linear pattern of a light-leaking portion according to the present invention.
Figure 7A:
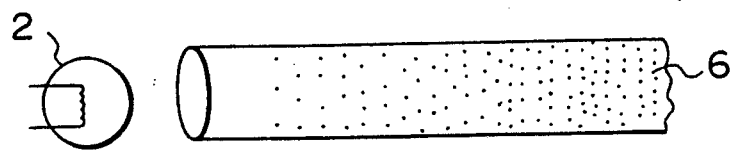
FIG. 7-(a) is a plane view illustrating an example of a light-leaking portion-forming pattern according to the conventional technique, and FIG. 7-(b) is a graph illustrating the relationship between the flaw density in the pattern shown in FIG. 7-(a) and the distance from the light source.
Figure 7B:
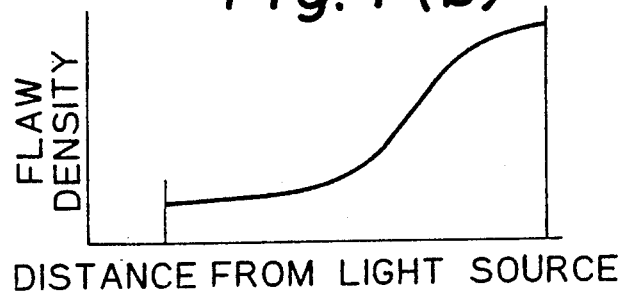

FIG. 6 illustrates an embodiment of the thus-obtained light-leaking portion. In the embodiment shown in FIG. 6, the light-leaking width on the left side near to the light source is narrow, and the light-leaking width is broadened as the distance from the light source increases and this change of the light-leaking width is a linear change.

An embodiment of the preparation of the optical fiber of the illumination panel of the present invention will now be described.

In this embodiment, the hot stamping method, which is industrially advantageous, is adopted for the preparation, and in this hot stamping method, the thickness of the cushion sheet spread below the optical fiber sheet is continuously or stepwise changed so that appropriate gradients are given to the light-leaking width of the light-leaking portion, the presence density of the flaws, and the depth of the flaws.

The obtained optical fiber sheet is bonded to the surface panel and the reflecting layer through adhesive layers, whereby an illumination panel is fabricated.

From FIG. 3, it will be understood that if flaws 6a having the same presence density and depth are formed, as the running angle $\theta$ of the light is larger, the light leaks more readily.

Figures 5A, 5B, 5C:
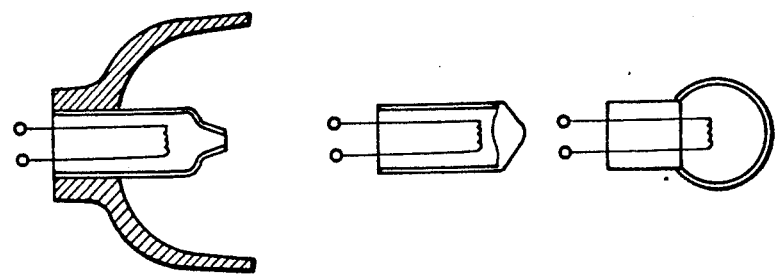
FIGS. 5-(a), 5-(b) and 5-(c) are partially sectional side views of light sources that can be used in the present invention.

As the light source used for the illumination panel of the present invention, there can be mentioned light sources shown in FIG. 5, for example, a reflecting mirror type light source [FIG. 5-(a)], a lens-equipped light source [FIG. 5-(b)] and a standard type light source [FIG. 5-(c)]. Regarding the outgoing angle distribution, in these light sources, the outgoing light angle is generally larger in the order of standard type > reflecting mirror type > lens-equipped type, and rays having a larger angle $\Theta$ shown in FIG. 3 are contained in larger amounts in this order. When the output of the light source is the same, the energy of rays capable of being incident on the optical fiber is generally higher in the order of reflecting mirror type > lens-equipped type > standard type. Accordingly, an appropriate light source is preferably selected according to the intended use and required characteristics. In the illumination panel of the present invention, a reflecting mirror type light source, and a lens-equipped light source are preferably used as the light source.

The present invention is not limited to the foregoing embodiments, and various modifications thereto can be made without departing from the scope of the present invention.

For example, although the light-leaking portion formed in the optical fiber is located on the side of the surface panel in the foregoing embodiments, the light-leaking portion can be located on the side of the reflecting layer. The performance of the completed illumination panel is changed according to the size and density of the flaws, the outgoing angle distribution of rays emitted from the light source and the presence or absence of the adhesive layer, and for example, the brightness uniformity, the absolute value of the brightness and the sharpness of the illumination are influenced by the arrangement position of the light-leaking portion. Therefore, the arrangement position is preferably selected according to the intended use.

Figure 8:
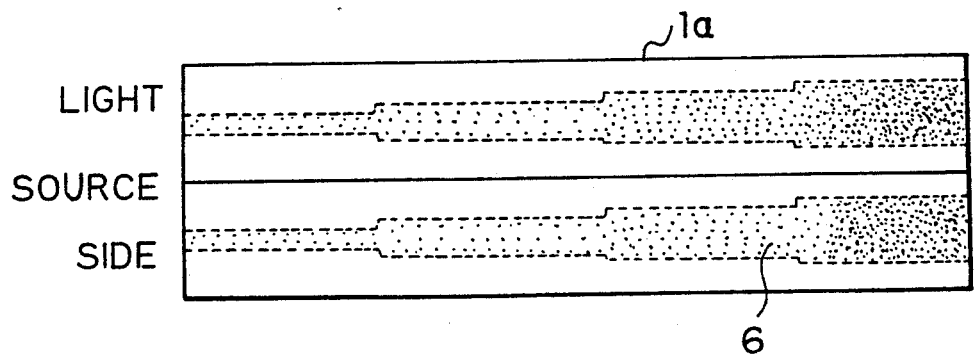
FIG. 8 is a plane view illustrating an optical fiber sheet showing a stepwise pattern of a light-leaking portion according to one modification of the present invention.

In the foregoing embodiments, the parameters concerning the light-leaking portion, i.e., the light-leaking width of the light-leaking portion, the presence density of the flaws and the depth of the flaws, are continuously changed in proportion to the distance from the end of the optical fiber sheet on the side of the light source, but these parameters can be changed stepwise as shown in FIG. 8.

In the foregoing embodiments, the light-leaking portion is formed on one surface of the optical fiber sheet, but in the present invention, an optical fiber having light-leaking portions formed on both the front and back surfaces can be used. In this case, a little more labor is required, but if the light-leaking portion-forming pattern is correct, there can be attained an effect comparable to or higher than the effect attained when the light-leaking portion is formed on one surface.

In the embodiments illustrated in the accompanying drawings, one light source is disposed, but in the present invention, light sources can be arranged on both ends of the optical fiber sheet. In this case, the optical fiber sheet is divided into two parts with the center thereof being as the boundary, and the light-leaking width of the leaking portion and the presence density and depth of the flaws are reduced toward both the ends of the optical fiber sheet.

As apparent from the foregoing description, the following effects can be attained according to the present invention.

(1) The entire illumination surface can be uniformly illuminated and the energy of rays passing within the optical fiber can be utilized at a high efficiency.

(2) Since the illumination panel can be easily prepared by the hot stamping method, an illumination panel having a uniform brightness and a high illumination efficiency can be easily prepared on an industrial scale.

(3) By appropriately controlling the above-mentioned three parameters concerning the light-leaking portion, various types of light sources can be utilized, and a good brightness uniformity can be attained in the illumination panel.

What is claimed:

1. An illumination panel, which comprises an optical fiber sheet formed by arranging a plurality of optical fibers having a core-sheath structure, which has at least one end optically connected to a light source and a light-leaking portion on at least one surface thereof, a surface panel arranged on the front surface side of the optical fiber sheet, and a reflecting layer arranged on the back surface side of the optical fiber sheet, wherein the light-leaking portion is formed of a plurality of flaws extending to the core of the optical fiber from the sheath thereof, the light-leaking width of the light-leaking portion increases toward the side far from the light source from the side near to the light source, the presence density of the flaws increases toward the side far from the light source from the side near to the light source, and the depth of the flaws increases toward the side far from the light source from the side near to the light source, whereby the entire illumination surface is uniformly illuminated.

2. An illumination panel as set forth in claim 1, wherein the light-leaking width of the light-leaking portion, the presence density of the flaws and the depth of the flaws are continuously changed in proportion to the distance from the end of the optical fiber on the side of the light source.

3. An illumination panel as set forth in claim 1, wherein the light-leaking width, the presence density of the flaws and the depth of the flaws are changed stepwise in proportion to the distance from the end of the optical fiber on the side of the light source.

4. An illumination panel as set forth in claim 1, 2 or 3, wherein the light-leaking portion is arranged on the side of the reflecting layer.

5. An illumination panel as set forth in claim 1, 2 or 3, wherein the light-leaking portion is arranged on the side of the surface panel.

6. An illumination panel as set forth in claim 1, 2 or 3, wherein the optical fiber has light-leaking portions on both of the front and back surfaces.

7. An illumination panel as set forth in any of claims 1 through 3, wherein bonding between the surface panel and the optical fiber sheet and bonding between the optical fiber sheet and the reflecting layer are effected through adhesive layers.

8. An illumination panel as set forth in claim 4, wherein bonding between the surface panel and the optical fiber sheet and bonding between the optical fiber sheet and the reflecting layer are effected through adhesive layers.

9. An illumination panel as set forth in claim 5, wherein bonding between the surface panel and the optical fiber sheet and bonding between the optical fiber sheet and the reflecting layer are effected through adhesive layers.

10. An illumination panel as set forth in claim 6, wherein bonding between the surface panel and the optical fiber sheet and bonding between the optical fiber sheet and the reflecting layer are effected through adhesive layers.

* * * * *